Feb. 17, 1970   E. REGENBOGEN   3,495,586
RECTOSCOPE WITH SPREADING MEANS
Filed July 21, 1966   3 Sheets-Sheet 1
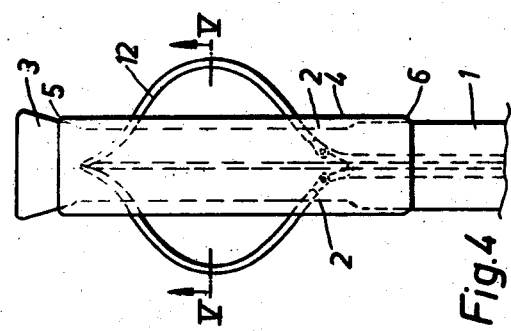
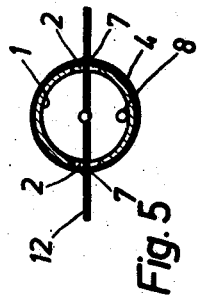
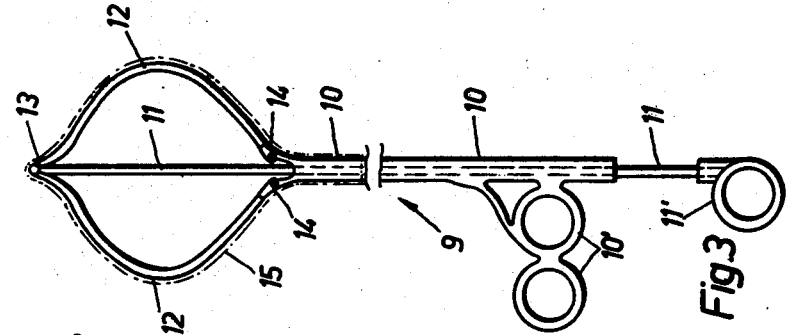
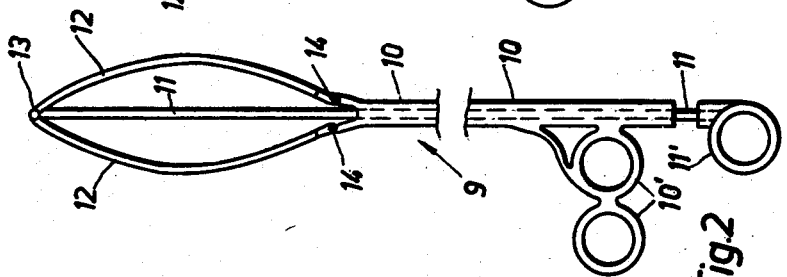
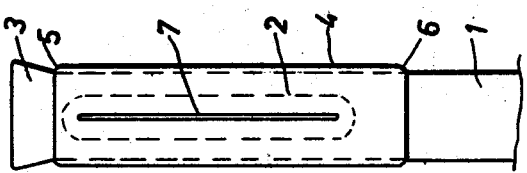
Inventor:
Eberhard REGENBOGEN
by: Arthur O. Klein
his Attorney Feb. 17, 1970     E. REGENBOGEN     3,495,586
RECTOSCOPE WITH SPREADING MEANS
Filed July 21, 1966     3 Sheets-Sheet 2

Inventor:
Dr. Eberhard REGENBOGEN
by: Arthur O. Klein
his Attorney

Inventor:
Dr. Eberhard REGENBOGEN
by: Arthur O. Klein
his Attorney

//  # United States Patent Office 3,495,586
Patented Feb. 17, 1970

3,495,586
RECTOSCOPE WITH SPREADING MEANS
Eberhard Regenbogen, Wilhelmstrasse 96,
Osnabruck, Germany
Filed July 21, 1966, Ser. No. 566,912
Claims priority, application Germany, July 28, 1965,
R 41,184
Int. Cl. A61b 1/06; A61m 31/00
U.S. Cl. 128—6
9 Claims

ABSTRACT OF THE DISCLOSURE

A rectoscope for the endoscopic examination of the intestines. The rectoscope includes a rectoscopic tube which has adjacent to its forward end at least one longitudinally extending slit. A spreading mechanism which is not connected to and separate from the rectoscopic tube is received in the latter and is axially slidable therein. This spreading mechanism has at least one spreading element which, when expanded, projects from the tube through the longitudinal slit thereof, and in its expanded condition the spreading element has a length substantially less than the length of the slit so that the spreading element is freely movable longitudinally of the slit in both directions with respect thereto. With this construction the tube and spreading mechanism can be longitudinally shifted one with respect to the other to advance the tube in a stepwise manner into the intestine to a desired degree.

---

This invention relates to an improved rectoscope adapted for endoscopic examinations of the lower human intestinal tract.

The known rectoscopes render generally satisfactory results in an examination of the area of the entire rectum. However, when the rectoscope is introduced further into the human intestinal tract into the area of the sigma, difficulties are generally encountered. The distance of penetration into the sigma, and, consequently, the area which can be covered by an endoscopic examination varies considerably from case to case. Sometimes it is only possible to introduce the instrument a maximum of 15 cm. from the beginning of the sigma. It has heretofore been impossible, however, to penetrate with the usual known rectoscopes into the upper sigmoid region. The latter region is separated from the lower crus sigmoideum by a kink. The latter's purpose is more functional than anatomical. Thus, this kink first of all manifests itself during rectoscopy and the concomitant stretching of the sigma and mesosigma.

It is a general object of this invention to provide a rectoscope with which also the upper region of the lower sigmoid muscle can be made accessible to inspection by said rectoscope.

It is another more specific object of this invention to provide a rectoscope with which the region of the upper sigma, i.e. the region beyond the aforementioned kink can be examined in most patients.

All attempts made heretofore to solve this problem and to reach the aforementioned region of the upper sigma with a rectoscope have failed until now. The attempts to bypass the kink were generally based on making the tube end of the rectoscope bendable and guidable.

The rectoscope of this invention differentiates itself from the known rectoscopes of the prior art in that near its forward tubular end it is provided with longitudinal slits, through which longitudinally movable spreading means of a spreading mechanism may act.

According to another feature of the invention, the forward tubular end of the rectoscope has the shape of a torus.

The rectoscope of this invention is further provided with a sleeve of suitable elastomer material which has slits corresponding to those in the forward tubular end of the rectoscope and which covers this end. There are preferably provided two opposite slits in the forward tubular end of the rectoscope which are offset by 90° with respect to the usual lamp socket in the rectoscope. The upper and lower edges of the sleeve which covers the forward tubular end of the rectoscope are advantageously rounded off, so that the outer shape of the rectoscope changes advantageously gradually.

According to a further feature of this invention, the spreading mechanism comprises a fixed outer tube in which a shaft is axially slidably mounted, this shaft being adapted to be manually moved by a handle which is secured thereto. The spreading means of the spreading mechanism comprise the aforementioned shaft which protrudes from one end of the tube and to the other end of which there are secured several flexible members which, when the shaft is pulled out of the tube, assume an arcuate shape. These flexible members are preferably made of a flexible metal, as for example sectors of a steel cable or wire which are covered with sheathing of rubber, synthetic rubber, silicone, latex, or other suitable material. The sheathing serves to protect and avoid damaging the mucous membranes of the intestines. The flexible metal members are preferably reinforced adjacent to their pivotable connections to the shaft and tube, so that they are not forcibly collapsed by the pressure exerted on them by the intestinal walls. As an additional protective measure against damage of the mucous membranes of the intestines, it is advantageous to cover the upper end of the spreading mechanism including the flexible members with a thin, highly elastic, but very strong sheathing made of rubber or other suitable elastomer material. This thin sheathing is adapted to be stretched by the flexible members and exits jointly with the latter through the longitudinal slits in the forward tubular end of the rectoscope. The aforementioned thin sheathing seals off the interior of the tube and also makes it easier to hygienically handle the rectoscope.

The penetration of the rectoscope beyond the kink in the sigma, which constitutes one of the principal objects of this invention, can be accomplished by drawing the sigma over the forward end of the tube by extending outwardly the flexible members, which causes a relative straightening of the sigma portion of the colon, which in turn facilitates the further penetration of the rectoscope into the upper region of the sigma. In contradistinction thereto, the rectoscopes of the prior art were introduced into the colon as far as possible without any auxiliary measures being taken and, consequently, rarely could the prior art rectoscopes be introduced beyond the aforementioned kink in the sigma.

An illustrative embodiment of a rectoscope constructed according to this invention, together with additional objects and advantages thereof, will be best understood from the following description of a specific embodiment when read in connection with the accompanying drawing in which:

FIG. 1 is a schematic plan view of the forward end of the rectoscope;

FIG. 2 is a schematic plan view of the spreading mechanism when it is in an unspread condition;

FIG. 3 is a schematic plan view of the spreading mechanism when it is in a fully spreaded condition;

FIG. 4 is a schematic plan view of the forward end of the rectoscope turned 90° from the position illustrated in FIG. 1 and with the spreading mechanism in a fully spreaded condition;

FIG. 5 is a cross-sectional view along line V—V of FIG. 4; and

Figure 6:
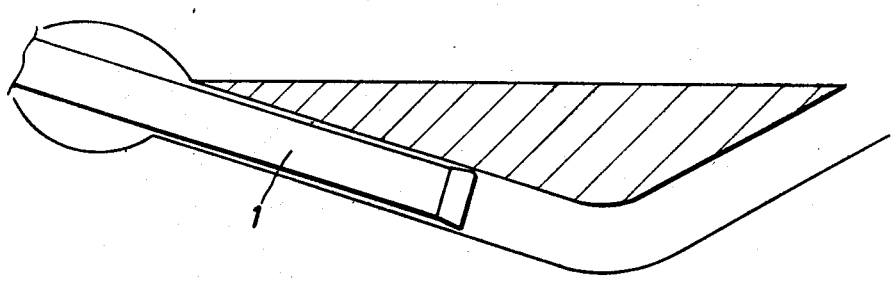
FIG. 6 to FIG. 9 illustrate schematically various phases of operation of the rectoscope of this invention during its introduction into the colon of a patient.

Referring now specifically to the drawing, there is illustrated in FIGS. 1, 4 and 5 the forward end of the rectoscope of this invention which comprises the usual metal tube 1. The latter has near its forward end a pair of opposite longitudinal slits 2. The tube 1 is a standard rectoscope tube having a graduation in excess of 30 cm. The two slits 2 have a length of about 110 mm. and a width of about 10 mm. The forward end of the tube 1 has the shape of a torus 3. The slits 2 begin approximately 3 mm. below the end of the torus-shaped portion of the tube 1. The forward end 3 of the rectoscope is covered with an elastic sleeve 4 made of rubber or other suitable elastomer material. The sleeve 4 can advantageously be glued or vulcanized onto the forward end 3 of the rectoscope. The upper edge 5 and the lower edge 6 of the sleeve 4 are rounded off, as can be noted in FIGS. 1 and 4, so that there is a gradual transition in contour from the metal tube 1 to the sleeve 4. The sleeve 4 has two longitudinal slits 7, the longitudinal axes of which coincide with the longitudinal axes of the slits 2 in the metal tube 1. The slits 7 in the sleeve 4 have, when the aforementioned dimensions are used for the slits 2, a length of about 100 mm., that is to say they are somewhat shorter than the slits 2. The slits 7 in the sleeve 4 are formed so that they do not gape and effectively seal the interior of the tube 1. Thus, the sleeve is made of a material having a thickness of about 2 mm. and a length of about 140 mm. As can be noted from FIG. 5, the slits 2 are spaced in the tube 1 about 90° from the usual location of the lamp socket 8.

The metal tube 1, covered near its forward end 3 with the sleeve 4 having a pair of slits 7 which overlie the pair of slits 2, is adapted to receive a spreading mechanism, the whole of which is designated by the numeral 9 and which is schematically illustrated in FIGS. 2 and 3.

The spreading mechanism 9 comprises a tube and a shaft 11 which is axially slidably mounted therein. The spreading mechanism is provided with a pair of finger loops 10' and a third finger loop 11'. The finger loops 10', 11' may also be mounted at an angle with respect to the tube 10 and shaft 11 (contrary to the schematic illustration of FIGS. 2 and 3), so that the finger loops 10', 11'' do not overlie the principal longitudinal axis of the tube 1 and do not cover the latter when the spreading mechanism 9 is introduced therein.

The spreading means proper are designated by the numeral 12 and consist of two segments of relatively stiff, yet bendable material. The two segments are respectively pivotably connected at 13 to the forward end of the shaft 11, and at their other end are respectively pivotably connected at 14 to the forward end of the tube 10. The spreading elements 12 are preferably made of bendable metal, for example segments of steel cable or steel wire, which are preferably covered with rubber, synthetic rubber, silicone, latex or other suitable elastomer material. The spreading elements 12 are preferably made stronger and consequently stiffer, adjacent to the pivotable connections 13 and 14, so that they undergo little or no bending in these regions. The spreading elements 12 can be moved from a relaxed and relatively unbent condition, as illustrated in FIG. 2, to a bent position by manually moving the shaft 11 downwardly. The bent position of the spreading elements 12 is illustrated in FIG. 3 in which each one of the spreading elements 12 assumes the shape of a substantially semi-circular arc. The distance between spreading elements 12, when they are in a relaxed unbent condition should not exceed 18 mm. so that the spreading mechanism 9 can be easily slidably inserted in the tube 1.

When the spreading elements 12 are, however, fully spread, the diameter of the formed circle, i.e. the maximum distance between the spreading elements 12, should be in the range of 80 mm. to 100 mm., which requires in certain cases the use of several spreading mechanisms.

FIGS. 4 and 5 illustrate in plan and in cross-section how the spreading elements 12 of the spreading mechanism 9 penetrate, when fully spreaded outwardly, through the longitudinal slits 2 of the tube 1 and the longitudinal slits 7 of the sleeve 4, so that they protrude from the outer periphery of the tube 1.

The handling of the rectoscope of this invention, which has been described in detail above, is as follows:

The tube 1, in particular in the region of the sleeve 4, is thoroughly lubricated with grease, ointment or the like, so that it may be more easily introduced into the colon and so that the spreading elements may more easily move through the slits 7 of the sleeve 4.

The tube 1, in a first phase, is introduced via the rectum into the lower crus sigmoideum, whereby the torus-shaped end 3 facilitates the penetration into the lower crus sigmoideum (FIG. 6).

Figure 7:
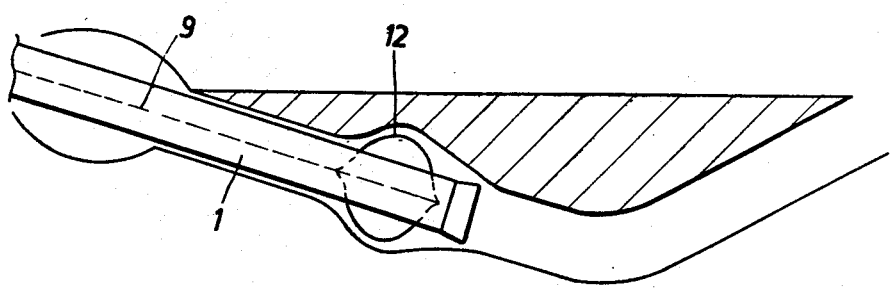

After the introduction of the tube 1 into the lower crus sigmoideum, the spreading mechanism 9 is slidably inserted into the tube 1 a predetermined distance which is determinable by a mark on the shaft 11. The spreader elements 12 are then spread out so that they protrude through the slits 2 and 7 (phase 1, FIG. 7) and cause an unfolding of the sigma.

Figure 8:
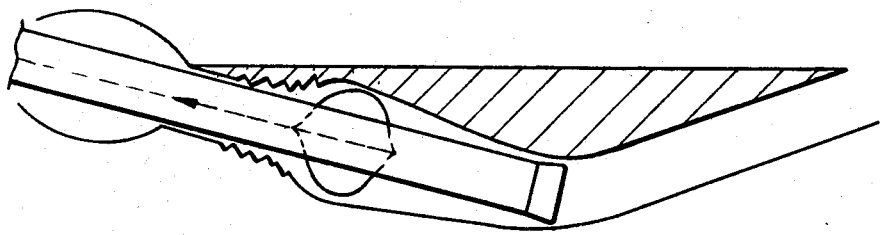
Figure 9:
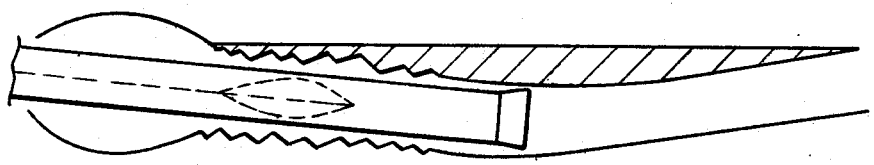

The spreading mechanism 9, while fully spreaded, is then retracted as far as possible in the direction of the arrow within the confines of the slits 2 and 7 (phase 2, FIG. 8). A further mark on the shaft 11 may be used to indicate to what point the retraction is possible to be executed. The intestinal walls are, of course, clearly visible during the retraction movement to the examining doctor who can clearly see by means of the optical system of the rectoscope the intestinal walls as they pass over the tube. The portion of the sigma which abuts against the forward end of the rectoscope and which is pulled back by the retraction of the spreading mechanism 9 undergoes a wrinkling in the vicinity of the rectum. In this manner a partial straightening of the kink in the colon also takes place.

Thereafter, the spreading mechanism 9 is relaxed so that it returns to an unspread condition and, in the event it has sufficiently deeply penetrated, it is removed from the rectoscope. On the other hand, if a further portion of the sigma is to be examined, the rectoscope is made to penetrate deeper into the intestine, the spreading mechanism 9 is again spread out at the forward end of the slits 2, respectively 7 and is retracted in its spread out condition. In this manner, a further portion of the intestine is made accessible to an endoscopic examination (phase 3, FIG. 3). The retraction step can be repeated several times. When the spreading mechanism 9 is relaxed, a temporary considerable straightening of the kink in the sigma occurs and, consequently, an endoscopic examination of the upper sigma is made possible.

There are no fixed rules neither as to how high into the intestines the spreading and retraction process can be made to take place, nor as to how far the intestine should be pulled back, nor as to how often the procedure should be repeated, nor whether the tube should be advanced while fixing the intestinal walls with the spreading mechanism. All of the foregoing must be decided on the basis of the experience and the skill of the attending physician, the anatomical condition of the patient and his disease process.

It has been stated previously that the sleeve 4 may be either vulcanized or glued onto the tube 1. A mere glueing of the sleeve 4 is more advantageous because it can be easily removed from the tube 1 after having been used for an endoscopic examination and can be replaced by a new one, which is obviously desirable for hygienic reasons. A sleeve 4 made of rubber has been found to be suitable because it can be stretched and can be mounted under tension on the tube 1 and can easily be removed again after use.

It is also advantageous to surround the upper end of the spreading mechanism 9 having the spreader elements 12 with a sheathing of thin, but strong and highly elastic rubber, which can be easily stretched by the spreader elements 12 and can exit together with them through the slits 2, respectively 7, of the sleeve 4 to the exterior of the tube 1. This sheathing is illustrated by means of dot-dash line in FIG. 3 and is designated with the numeral 15.

What I claim is:

1. A rectoscope for the endoscopic examination of the sigma region of the intestines, comprising in combination, a rectoscopic tube, said tube having adjacent to its forward end a plurality of first longitudinal slits, a spreading mechanism unconnected with but axially slidably mounted within said rectoscopic tube, said spreading mechanism having a corresponding plurality of spreading elements connected thereto, each one of said plurality of spreading elements having a portion thereof which is adapted to be expanded so as to form an arcuate-shaped projection which projects from said tube through a corresponding longitudinal slit said spreading elements being so spaced about the circumference of the rectoscopic tube so as to contact the intestines and space the tube therefrom when in their expanded condition and said arcuate-shaped projections of said spreading elements when in their expanded condition being substantially shorter than the length of said slits so as to be longitudinally movable between the opposite ends of and within the confines of the corresponding longitudinal slit for drawing the intestines successively over the tube.

2. The rectoscope for the endoscopic examination of the intestines as set forth in claim 1, wherein said forward end of said rectoscopic tube is torus-shaped.

3. The rectoscope for the endoscopic examination of the intestines as set forth in claim 1, wherein a sleeve of elastometer material is coaxially mounted over said rectoscopic tube adjacent to its forward end, said sleeve having a corresponding plurality of second longitudinal slits, said first and second longitudinal slits being in register and said arcuate-shaped projections of said spreading elements being adapted to project from said tube through said first and second longitudinal slits and being longitudinally movable within the confines of said first and second longitudinal slits.

4. The rectoscope for the endoscopic examination of the intestines as set forth in claim 3, wherein the upper and lower edges of said sleeve are rounded off.

5. The rectoscope for the endoscopic examination of the intestines as set forth in claim 3, wherein said spreading mechanism comprises a second tube, first handle means secured to said second tube, a shaft slidably mounted in said second tube, second handle means secured to said shaft, said spreading elements being pivotably connected at one of their ends to said second tube and at the other one of their ends to said shaft and being adapted to assume an arcuate shape when said shaft is manually retracted in said second tube.

6. The rectoscope for the endoscopic examination of the intestines as set forth in claim 5, wherein each one of said plurality of spreading elements is made of steel wire and is covered by a layer of elastomer material.

7. The rectoscope for the endoscopic examination of the intestines as set forth in claim 6, wherein the portions of said spreading elements adjacent to the pivotable connections thereof are made of stronger and stiffer material than the remaining portions of said spreading elements.

8. The rectoscope for the endoscopic examination of the intestines as set forth in claim 6, wherein at least the forward end of each one of said spreading elements and said shaft are surrounded by a sheathing of relatively thin, strong and very elastic material, said sheathing being adapted to be projected together with said spreading element through said first and second longitudinal slits.

9. The rectoscope for the endoscopic examination of the intestines as set forth in claim 1, wherein said tube has a pair of oppositely arranged longitudinal slits, and a lamp operatively mounted in said tube at an angular distance of about 90° from each one of said longitudinal slits.

References Cited

UNITED STATES PATENTS

| | | | |
|---|---|---|---|
| 365,969 | 7/1887 | Collins | 128—243 |
| 1,621,159 | 3/1927 | Evans | 128—6 |
| 1,719,428 | 7/1929 | Friedman | 128—242 |
| 1,863,234 | 6/1932 | Bacon | 128—303 |
| 2,067,031 | 1/1937 | Wappler | 128—7 |
| 2,072,346 | 3/1937 | Smith | 27—24 |
| 2,586,553 | 2/1952 | Moscarello | 128—243 |
| 2,704,541 | 3/1955 | Wyatt | 128—4 |
| 2,767,705 | 10/1956 | Moore | 128—4 |
| 2,792,837 | 5/1957 | Kardos | 128—351 |
| 3,044,461 | 7/1962 | Murdock | 128—4 |
| 1,901,731 | 3/1933 | Buerger | 128—7 |
| 3,144,020 | 8/1964 | Zingale | 128—4 |

FOREIGN PATENTS 72,442  4/1951  Denmark.

OTHER REFERENCES

Surgery, Gynecology, and Obstetrics, 1927, pp. 700–701.

RICHARD A. GAUDET, Primary Examiner

K. L. HOWELL, Assistant Examiner

U.S. Cl. X.R.

128—243, 345